United States Patent [19]
Maddox

[11] Patent Number: 5,520,312
[45] Date of Patent: May 28, 1996

[54] HANDICAPPED FISHERMAN'S POLE AND LINE RETRIEVER

[76] Inventor: Gilbert O. Maddox, 5805 Bloomingdale Ave., Richmond, Va. 23228

[21] Appl. No.: 403,617

[22] Filed: Mar. 14, 1995

[51] Int. Cl.$^6$ .................................................. A01K 97/10
[52] U.S. Cl. .......................... 224/607; 224/200; 224/251; 224/922; 224/625; 43/21.2
[58] Field of Search ...................... 224/200, 922, 224/149, 162, 185, 197, 206, 208, 251; 43/21.2

[56]         References Cited

U.S. PATENT DOCUMENTS

| 1,198,202 | 9/1916 | Drinkard | 224/922 |
|---|---|---|---|
| 2,537,456 | 1/1951 | Goss . | |
| 2,598,021 | 5/1952 | Schwanke . | |
| 2,670,111 | 2/1954 | Stahle . | |
| 2,709,544 | 5/1955 | Barringer . | |
| 5,014,891 | 5/1991 | King . | |
| 5,441,186 | 8/1995 | Halligan | 224/208 X |

FOREIGN PATENT DOCUMENTS 2048633  12/1980  United Kingdom .................... 43/21.2

*Primary Examiner*—Renee S. Luebke
*Attorney, Agent, or Firm*—David H. Semmes

[57]            ABSTRACT

A fishing pole and line retriever for the handicapped person who has the use of but one arm, includes a body and torso splint 10 which is slideably adjustable to torso size, a fishing pole holder 20, pivoted from the splint and retainer straps 30 for the torso and waist of the fisherman. The intermittently useable pole holder 20 extends frontally of the lower portion of the splint frame and a pole leash 40 is detachably secured to the holder. The assembly is characterized by its fabrication from rigid tubular plastic and adjustable securing straps for the torso and waist.

3 Claims, 3 Drawing Sheets

HANDICAPPED FISHERMAN'S POLE AND LINE RETRIEVER

BACKGROUND OF THE INVENTION

There is currently inadequate means to enable a handicapped fisherman to cast and retrieve, as, for example, when one arm is disabled. Accordingly, this invention has been conceived and designed to permit such a fisherman to cast, to immobilize the rod and retrieve, using his active arm, hand and fingers.

Although a great deal of development has resulted in useful fishing rod aids, the known art is lacking in a completely utilitarian body-supported fishing line, retrieval apparatus.

THE PRIOR ART

| INVENTOR | DATE | U. S. Pat. No. | DESCRIPTION |
|---|---|---|---|
| Goss | Jan., 1951 | 2,537,456 | Fishing Rod Support |
| Schwanke | May 1952 | 2,598,021 | Fishing Pole Holder |
| Stahle | Feb., 1954 | 2,670,111 | Fishing Rod Holder |
| Barringer | May 1955 | 2,709,544 | Rod and Reel Holder |
| Brooks | Jan., 1961 | 2,969,899 | Holding Device for Fishing Rods |
| King | May 1991 | 5,014,891 | Fishing Aid |

SUMMARY OF THE INVENTION

The fishing pole and line retriever of this invention includes a reversible body splint which is VELCRO® hook and loop fastener secured to the belt of the user's waistline, both in the front and back. There is also an adjustable shoulder strap, securing the splint to the body. The splint itself has a rear vertical extension which serves to stabilize the unit during use and the splint likewise provides a pivot for the pole holder and a pole rest, as well. Ideally, the retriever has a flexible pole leash, permitting pole recovery in the event of slippage or loss of balance.

DESCRIPTION OF PREFERRED EMBODIMENTS

This handicapped fisherman's fishing pole line retriever embodies four principal components, namely, the body and torso splint 10, the fishing pole holder 20, the retainer straps 30 and, finally, the pole leash 40, each with its associated elements. Preferably the frames, connectors, caps and tees of the splint are of plastic, tubular cross-section.

Figure 1:
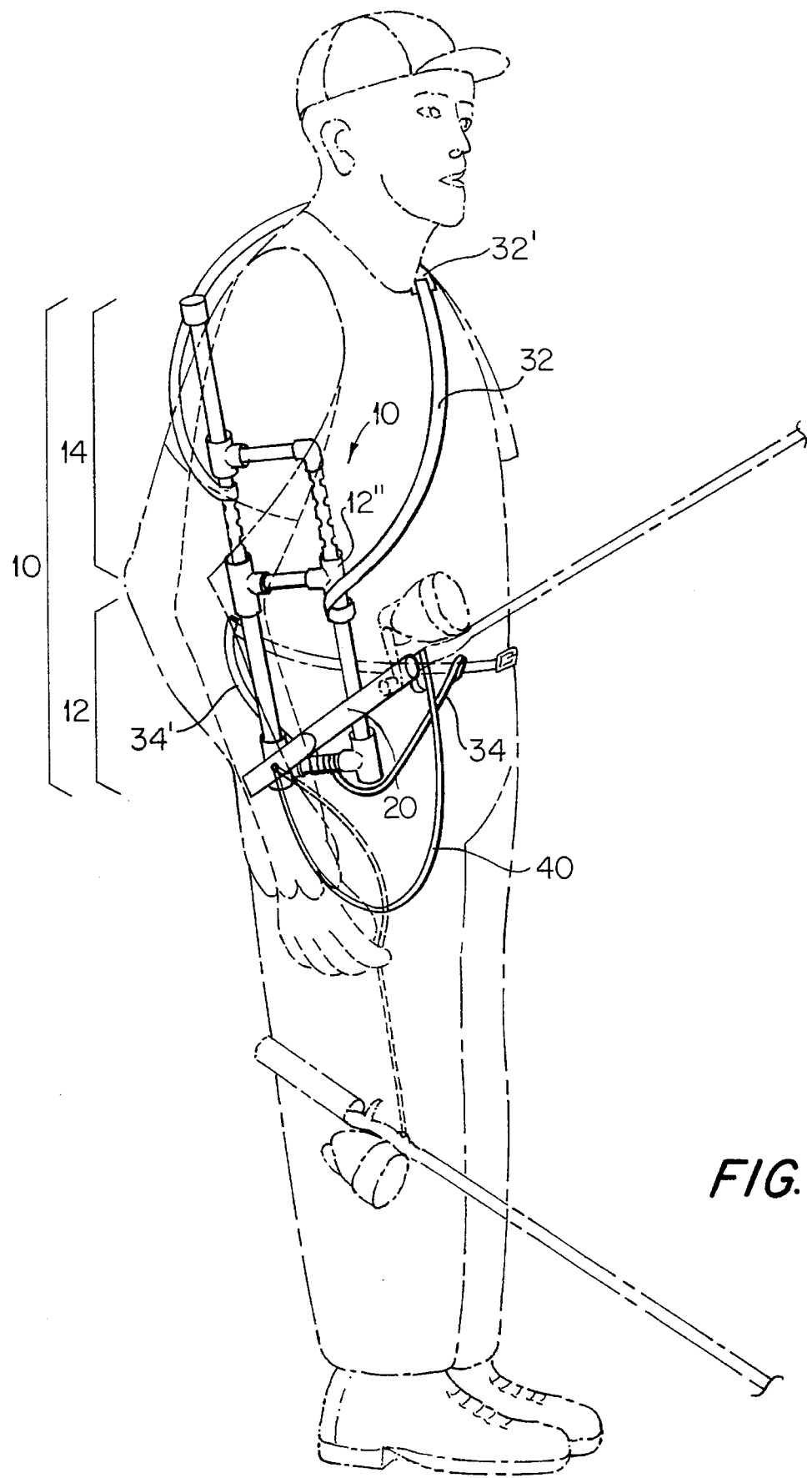
FIG. 1 is a view in perspective of the invention as applied to the body of a fisherman.
Figure 2:
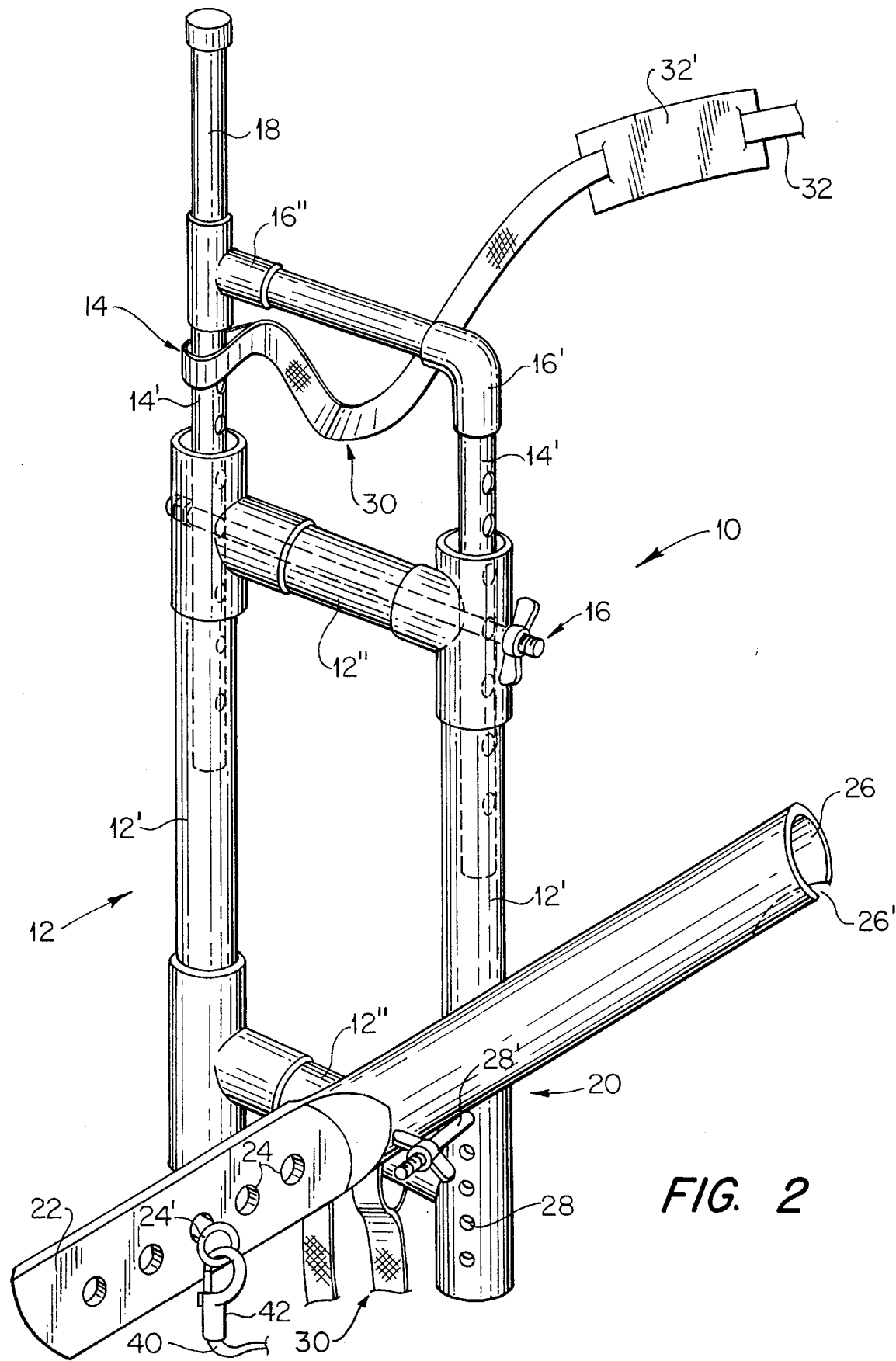
FIG. 2 is an enlarged view in perspective of the invention, illustrating the basic components and coactive elements.
Figure 3:
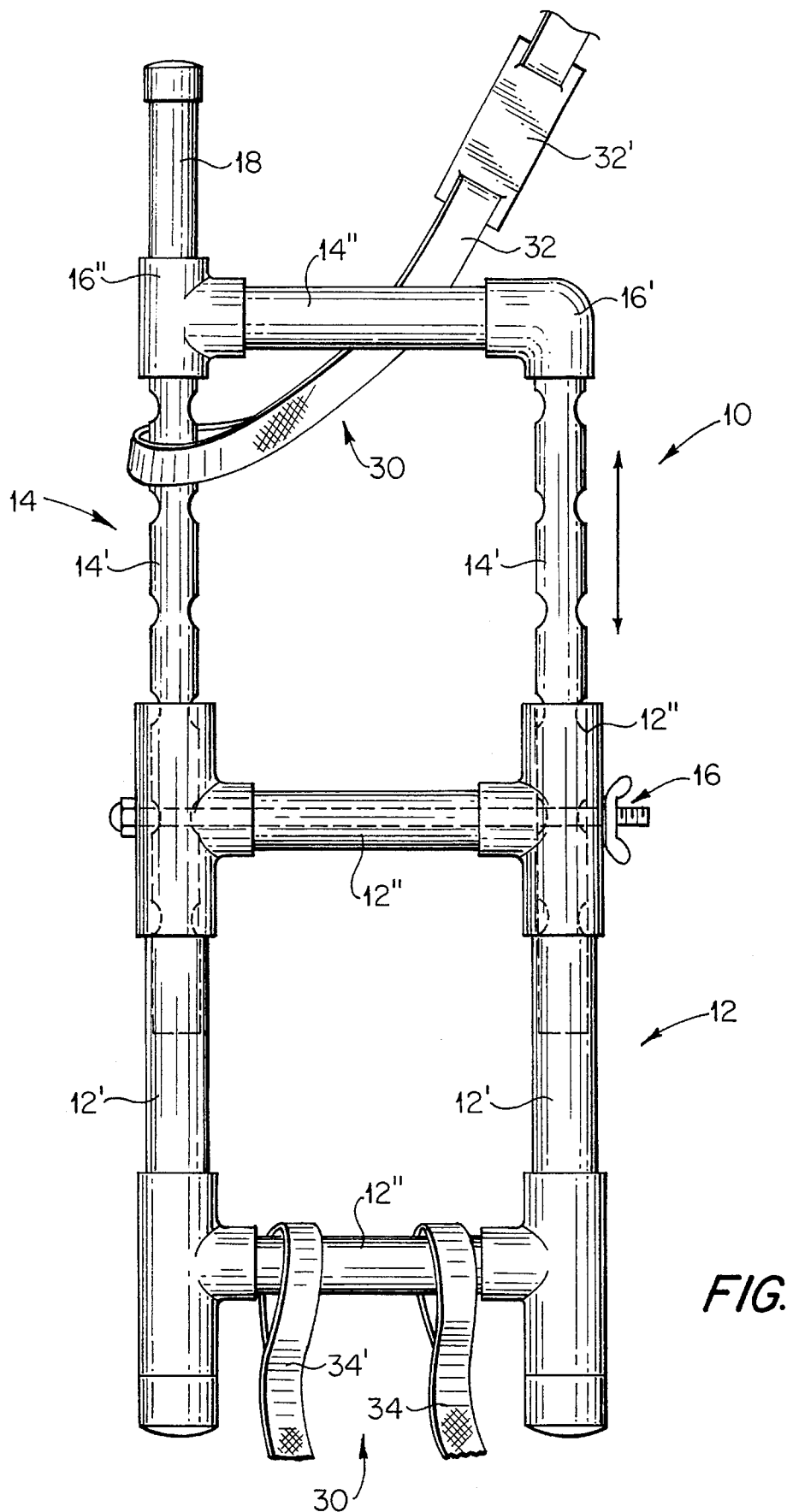
FIG. 3 is an enlarged view in side elevation of the basic components and coactive elements.

Referring to FIGS. 1–3 of the drawings, the body splint 10 comprises lower frame 12 with its connectors 12", each retaining vertical, front and rear tubular legs 12' in spaced-apart relation, as indicated. See FIG. 1. The upper connector 12" is adapted to receive an adjustment anchor, hereinafter described. The upper frame 14 of the body splint is vertically slideable, relative to lower frame 12, the tubes 14' comprising the vertical legs of the frame 14. These legs 12 have adjustment holes bored transversely therein to receive the vertical adjustment anchor 16, comprising a threaded rod which passes through the connector 12". The respective upper legs 14' are spaced apart and slideably retained in that position by the upper connector 14". This arrangement permits armpit fitting to various fishermen. There are two caps for the legs 14', the forwardmost cap comprising a hollow elbow 16' and the rearwardmost tee 16", comprising a T-shaped tubular receptor. Extending from this hollow tee is a fixed torso and shoulder abutment 18 to secure the splint against the upper body of the user.

Referring to FIG. 2, a pivotal fishing pole holder 20 is depicted, the same consisting of a tubular member, compressed at its anchor end 22 and open at its pole retainer end 26. The holder 20 includes in its anchor end 22, plural in-line bores 24, permitting adjustable anchorage of the holder 20 by means of a holder pivot element 24', the pivot element having connection between the base of the pole holder 20 and the tee of the rearward leg 12' of the body splint. At the far and free end of the holder 20 is a holder retainer cavity 26, the lowermost portion of the cavity defining a V-cut 26', to removably receive and secure the fishing pole reel and its ferrule mount. As will be seen, plural apertures 28 are bored through the forwardmost leg 12' of the bottom half of the body splint, these apertures receiving a fishing pole holder support 28' upon which the fishing pole holder may rest during usage. As will be appreciated, the fishing pole holder support 28' includes a tubular member which extends through the forward leg of the bottom half of the body splint, outwardly thereof so that the fishing pole holder 20 may rest thereon.

Secured to the upper leg 14' of the upper frame 14 is a torso strap assembly 30 consisting of torso strap 32 which is adapted to extend around the back, across the shoulder, frontally across the chest of the fisherman and to be retained tightly by VELCRO® hook and loop fastener over connector 14" to itself or to connector 12" of the lower frame body splint 10. See FIGS. 1 and 3. The strap 32 is padded by slideably adjustable shoulder pad 32'. Two waist straps 34—34' are anchored to the lower tubular connector 12". In FIG. 1 the rear strap 34' is shown attached to the wearer's conventional belt. Its anchor end is shown in FIGS. 2 and 3. Its free end is shown engaging the belt. In effect it loops upon itself over the belt and the free end attaches to the anchor end by VELCRO® hook and loop fastener connection. A similar loop attachment to the front of the fisherman's belt is made by the waist strap 34. See FIG. 1.

A pole leash 40 is secured, as shown, to the holder 20, its function being to present a fail-safe anchor in the event of slippage of the pole rig from the fisherman. See FIG. 1. If the fisherman loses his balance and, he drops the pole, it is within easy retrieval. The anchor and pole ends of the leash bear a metal, 360° swivel, spring loaded, safety clasp 42 attached to each end of the leash on each end of the leash.

FISHING UTILITY

Preferably with assistance, the fisherman straps the torso splint 10 onto himself, the splint projecting forwardly under his mobile arm; the pole holder 20 is set pivotally outward from the splint 10, crossing outwardly of the frontal leg 12'. Appropriate pivot adjustment having been established by means of elements 24—24' on end 22, additional adjustment may or may not be made for the vertical angular relationship of fishing pole. The fishing pole handle is then fitted into the holder 20 at free end 26, the ferrule mount of the pole locking into the V-groove 26', the ferrule mount locking into the V-groove 26'.

The invention having been defined with specific reference to the combination described and shown, is limited solely by the scope of claims hereinafter recited.

I claim:

1. A handicapped fisherman's fishing pole and line retriever wherein a conventional fishing pole may be operably secured to a fisherman's body torso comprising:
   a) a body torso splint including lower and upper frames which include pairs of legs, the upper frame being adjustably slideable within the lower frame, said pairs of legs being respectively connected to each other in spaced-apart relation by connectors and an adjustment anchor within the lower frame securing the upper frame in vertically adjustable position relative to the lower frame and a vertical leg extension projecting upwardly from the rear of the upper frame;
   b) a fishing pole holder adjustably pivoted from a rearward leg of the lower frame and projecting forwardly thereof, said holder having a tubular free pole retainer end to intermittently receive the handle of a fishing pole;
   c) torso and waist retainers including a torso strap secured to the upper frame to extend across the back, across the shoulder, frontally across the chest of the fisherman and to reengage the torso splint, securing it tightly against the torso of the fisherman, a pair of retainer straps secured to the lower frame for engagement with a waist belt of the fisherman, whereby the splint is anchored top and bottom for fishing stability relative to a fisherman's torso.

2. The handicapped fisherman's fishing pole and line retriever of claim 1 wherein the fishing pole holder is of tubular cross-section, a near end thereof being compressed laterally, wherein plural apertures which are axially aligned in spaced-apart array provide adjustment seats for a holder pivot element passing through a rear leg of the lower frame, the holder defining a pole cavity and a V-cut to receive and removably secure a fishing pole handle and ferrule mount.

3. The fishing pole holder of claim 2 wherein a flexible fishing pole leash is detachably secured to the holder pivot element, said leash having a metal, 360° swivel, spring loaded, safety clasp on each end of the flexible leash.

* * * * *